United States Patent [19]

Martin et al.

[11] 4,042,375
[45] Aug. 16, 1977

[54] ROASTING PROCESS FOR THE DIRECT REDUCTION OF ORES

[75] Inventors: Anwyn Margaret Martin, Prahran; Donald Ferguson Stewart, Doncaster; Andrew Baikie Swanson, North Melbourne, all of Australia

[73] Assignee: ICI Australia Limited, Melbourne, Australia

[21] Appl. No.: 620,047

[22] Filed: Oct. 6, 1975

[30] Foreign Application Priority Data

Oct. 14, 1974 Australia ............................. 9267/74

[51] Int. Cl.$^2$ .......................... C22B 1/08; C22B 1/24
[52] U.S. Cl. ................................. 75/4; 75/3
[58] Field of Search .......................... 75/3–5, 75/7–9

[56] References Cited

U.S. PATENT DOCUMENTS

| 2,869,850 | 1/1959 | Wienert | 75/3 |
| 3,382,063 | 5/1968 | Imperato | 75/3 |

Primary Examiner—Peter D. Rosenberg
Attorney, Agent, or Firm—Cushman, Darby & Cushman

[57] ABSTRACT

A roasting process for the direct reduction of ores containing iron oxides which process comprises the following steps in sequence;

1. forming core pellets comprising finely ground ore;
2. coating the core pellets with a coke precursor so that the ratio of skin thickness of coke precursor to the diameter of the core pellets is in the range from 0.1:20 to 1:2.
3. heating the coated pellets in a substantially non-oxidizing atmosphere to a temperature below 1200° C but high enough to cause the coke precursor to form a coke skin around the core pellet;

wherein the coke precursor comprises from 5 to 25% w/w of a halide salt.

6 Claims, No Drawings

ROASTING PROCESS FOR THE DIRECT REDUCTION OF ORES

This invention relates to the direct reduction of iron ore in a roasting operation.

In the past most iron ore has been converted to hot metal in blast furnaces. The blast furnace has some disadvantages however which may serve to limit its use in the future. It requires a considerable capital investment both for the furnace itself and its associated coke ovens and basic oxygen furnace. Furthermore, the production cost of its product pig iron is particularly sensitive to economies of scale. As a result, there is an economic incentive to install larger plants than might otherwise be desirable.

New methods of making iron and steel which circumvent the conventional blast furnace and basic oxygen furnace are gaining in popularity. These methods are generally termed direct or low temperature reduction and have several advantages. Firstly, for small production rates, the combination of direct reduction followed by electric furnace steelmaking has a cost lower than conventional methods. Secondly, depending on the process, direct reduction processes may be able to use indigenous reductants which are unsuitable for the manufacture of coke for the blast furnace.

Recently a new method of making steel involving the use of iron-carbon composites has been suggested as a source of iron and energy for the steel industry. These composites could be preheated by the steelmaking off-gases and their carbon component reacted with oxygen to produce steel thereby circumventing the use of electric furnaces.

In spite of inherent advantages, there remain some problems in the successful application of these new methods. During reduction, for example, the iron particles or pellets are very reactive and are at temperatures close to those where interparticle or interpellet sintering can cause blockage of the fluid bed or kiln in which the reaction is taking place. Such blockage could easily occur if there were small deviations from the ideal bed temperature. Furthermore, if during reduction the level of gases oxidizing towards iron such as $CO_2$ and $H_2O$ is allowed to increase, reduction will cease. After successful metallization the product must be in a form that is not readily attacked by atmospheric water and is sufficiently dense to be easily charged to an electric furnace. If not in this form, it must be agglomerated by, for example, briquetting.

We have now found a process of reducing pellets of ores in which the pellets retain their pellet form and have a greatly reduced tendency to coalesce during reduction. They furthermore have the advantage of an outer layer of carbonaceous material which inhibits reoxidation at high temperatures by kiln geases. The carbonaceous material can, in addition, be a source of energy in the steel making process.

Accordingly we provide a process for the preparation of coke skinned pellets of ores containing iron oxides which process comprises the following steps in sequence;

1. forming core pellets comprising finely ground ore;
2. coating the core pellets with a finely ground coke precursor so that the ratio of skin thickness of coke precursor to the diameter of the core pellets is in the range from 1:20 to 1:2;
3. heating the coated pellets in a substantially nonoxidizing atmosphere to a temperature below 1200° C but high enough to cause the coke precursor to form a coke skin around the core pellet;

wherein the coke precursor comprises from 5 to 25% w/w of a halide salt.

The coke skinned pellets formed by the process of our invention are suitable as feed to a reductive roasting process to convert the iron oxides to metallic iron.

By halide salt we mean throughout this specification an alkaline earth metal chloride or fluoride or an alkali metal chloride or ammonium chloride.

The nature of the iron ore is not critical. All ores containing iron oxides are suitable for our process. Typical ores include magnetite, haematite, goethite, bauxite, ilmenite, limonite, titano-magnetite, laterite, chromite and serpentinite.

The pellets may be made using normal pelletising apparatus. The nature of the kiln is not critical but preferably the kiln is a vertical kiln.

In a typical pelletising process ore, preferably in the size range of 10 BSS mesh to fines, with or without solid carbonaceous reductant, preferably in the size ranges 10 BSS mesh to fines, is pelletised with water in a conventional pan or drum granulator to form green pellets, preferably in the size range ¼ inch to 1 inch.

The green pellets are then coated with a layer of coke precursor mixture preferably of a size range 10 BSS to fines.

These pellets are dried and either fed to a kiln in which the reduction will take place and the coking coal be converted to coke in situ in a preliminary step in the upper portion of the kiln or else the pellets are coked in a separate furnace in the absence of air. The presence of the halide salt during the coking maintains the dimensional stability and integrity of the carbon skins around the pellets and prevents inter-pellet agglomeration. The halide salt may either be added in the coke precursor mixture or the halide salt may be incorporated in the skin of the pellet before coking by for example absorption of a solution of the halide salt, e.g. brine.

Conventional pelletising aids may be added to the mixture of ore and coke precursor so as to impart strength to the green pellets. Such aids are well known in the art and include for example bentonite, high molecular weight polyacrylamides and starches. Preferably the pelleting aid is organic in origin and will decompose during the coking process. A suitable organic pelletising aid is for example Dinagum, a complex natural polysaccharide added in the range of 0.01% to 1%. (Dinagum is a Trade Mark).

It is a requisite that on coking the coke precursor should form a coherent skin of coke and not retain its original shape and structure. Thus, some components of the coke precursor must become plastic and incorporate into a continuous structure the remaining rigid components of the coke precursor. This plastic mass must change into a rigid structure on continued heating. By coke precursor we mean throughout this specification a carbonaceous material which on decomposition forms coke.

Typical coke precursors are mixtures of halide salts with finely ground carbonaceous material chosen from the following groups: coking coals; blends of coaking coals and non-coking coals; and blends of non-coking coals and/or coking coals, chars or cokes in each case optionally with suitable binders such as pitch or fuel oil. Preferably the coke precursor is a mixture of a coking coal and a halide salt optionally mixed with preformed coke or char.

Coke for the purpose of this invention is defined throughout this specification as an essentially volatile-free firm cellular mass, mostly of carbon, formed by the decomposition of carbonaceous materials.

In a further aspect of our invention we provide coke skinned pellets comprising a core of an ore containing iron oxides and a coke skin wherein the thickness of coke skin to diameter of the pellet core is in the range from 1:20 to 1:2 and wherein the coke skin comprises a halide salt.

The coke skinned pellets of our invention need not be isolated but may be used directly as feed for a reductive roasting. In a preferred aspect of our invention the pellets are coked and reduced in a single kiln unit.

A general advantage of the coated pellets is that the reduced ore obtained by the reductive roasting treatment contained within the pellet is protected from oxidation by the surrounding coke layer. The coated pellets obtain their strength from the external coke skin and therefore this has the advantage that the core of the pellet may be made up to give optimum results in the metallurgical treatment without regard to strength. The core of the pellet may comprise a solid carbonaceous material, and if this material is present it may be a coke precursor or a coke matrix or preferably a non-binding carbonaceous material such as for example ground coke, ground char or graphite.

Additives known to those skilled in the art may also be present in the core.

The nature of the coke skin on the pellets in the preferred aspect of our invention is not narrowly critical.

In general we have found that improved results in the reductive roasting processes may be obtained by careful attention to the exact nature of the coke skin around the pellet. We have found that it is important for high efficiency that the coke skin is not cracked or fissured and that the skin does not crack or collapse under thermal stress but the pellet retains its physical integrity during the reductive roasting.

The important factors influencing the nature of the coke skin are
1. nature and amount of halide salt in the coke precursor skin
2. the ratio of size of the pellet core to the thickness of the layer of coke precursor used in forming the skin
3. nature of the coke precursor used in forming the skin
4. conditions of coking.

We have found that whereas pellets comprising coke precursor mixtures with no halide salt coalesced during coking, pellets comprising an alkaline earth metal halide or an alkali metal halide did not coalesce during coking.

The method of adding the halide salt is not critical. For example the halide salt may either be added directly to the coke precursor mixture used in coating the core material or alternatively, the pellet prior to coking may be moistened with a concentrated solution of halide salt..

The amount of halide salt is critical to the invention. Less than 5% salt gives severe agglomeration of the product and more than 25% gives a weak, friable product. Satisfactory results are obtained using from 5 to 25%, preferably 10–20%, halide salt in the coke precursor. The nature of the halide salt is not narrowly critical. Usually it is most economic to use sodium chloride as the halide salt.

The size of the core of the pellets is not narrowly critical. We have found that for most processes a convenient core size is in the range from 0.25 cm to 5 cm diameter preferably from 0.5 cm to 2.5 cm.

The thickness of coke skin around the core to give the pellets strength should generally increase as the diameter of the core increases. The amount of coke skin required at the start of the reductive process also depends on the conditions under which the pellet is treated. Processes in which a large proportion of the coke skin is consumed must initially have a thicker coating of coke. Satisfactory thicknesses of coke skin for any specific process may be found by simple experiment. However for normal vertical kiln operation it has been found that satisfactory ratios of coke precursor skin thickness to core diameter are in the range from 0.5:10 to 5:10 preferably 0.8:10 to 2.3:10. On coking in a reducing atmosphere the coke precursor skin is converted into a coke skin of approximately the same thickness as the coke precursor skin and containing approximately the same mass percentage of halide salt.

The ratio may require increasing if the pressures generated in the vertical kiln are higher than normal and may be decreased if the pressures are lower. The nature of the coke precursor used for coating the pellets is not narrowly critical; however we have found that when coking coal is used as the coke precursor that the pellets have a tendency to crack under thermal stress. In a preferred embodiment of our invention the pellets are coated with the coke precursor comprising powdered coke or other inert materials preferably carbonaceous in admixture with a coke precursor such as coking coal. We have found that pellets coated with a mixture of coking coal and inert material in a ratio in the range from 1:2 m/m to 9:1 m/m have a reduced tendency to crack under thermal stress. The nature of the inert material is not critical; for example a suitable source of inerts is the recycle coke obtained in the process but other types of coke, coal chars or graphite may also be used. Non-carbonaceous inert material may also be used; suitable inert material is for example fly ash, coke clinker, ceramics such as crushed brick, beach sands such as ilmenite, aluminium oxide and cement clinker. Throughout this specification the term inerts is used to mean the inert material that is mixed with the coking coal.

The heating rate during the coking stage is the factor having the greatest influence on the properties of the coked pellet skin, although its effect can be very much reduced by variations in skin composition. Fast heat-up rates generally produce porous, swollen skins, submetallic in appearance and highly resistant to abrasion; in extreme cases pellets may be highly deformed, extensively ruptured and welded into a single mass with little inter-pellet voidage remaining. As heat-up times increase swelling is reduced and shrinkage may even occur, pellets become denser, blacker and duller, deformation and sticking disappear and resistance to abrasion is lowered. Coking should be preferably carried out in an inert or reducing atmosphere suitably carbon dioxide, nitrogen, carbon monoxide, hydrogen, steam or mixtures thereof.

We have found that the addition of a non-coking component such as preformed ground coke or coal char as a diluent to the skin composition progressively diminishes the importance of heat-up rate as its proportion increases, by reducing swelling, sticking, deformation and rupture. Beyond certain levels, however, depending on the nature of the coal, char or other inerts, addition causes weakening of the skins. The slower the heat-up rate, the lower is the level of inerts which can be tolerated without fall-off in strength.

The size of the inerts appears to have only a minor effect on the properties of the coated pellet. In general we prefer to use an inert of such size that at least 50% passes through a 60 BSS mesh. However we have found if very coarse inert material is used that it is difficult to find suitable coking conditions which ensure that the coke formed from the coke precursor envelops the inerts and thus the skin tends to be weak.

The degree to which the coking coal is ground also has important effects on the skin properties. Fine-grinding appreciably reduces swelling, sticking, deformation etc., and has the ability, under the appropriate conditions of heat-up rate and/or inerts addition to yield smooth, dense very resistant skins within which inert particles can be firmly incorporated. The absolute level of inerts acceptance is, however, lowered by fine-grinding of the coking coal.

We believe that the behaviour of the coated pellets may be explained by the theory given below, however, we do not wish to be limited in any way by this theory which is only put forward as an aid to understanding the invention.

It is known that during the coking procedure coal passes firstly through a temperature region (350–415° C) in which some components become fluid and subsequently through a region (400–460° C) in which there is a rapid evolution of volatiles. If the temperatures of gas evolution is reached before decomposition has caused the fluid components formed at the lower temperature to resolidify, a foam of low viscosity will form. This foam has the ability to surround and incorporate particles of inert material such as char; on resolidification these rigid particles add strength to the residual carbon skeleton left by the foam. Hence inerts addition, combined with fast heat-up rates leads to strong skins.

At extremely high rates of heating, gas generation at the surfaces of the particles within the coal layer may be more rapid than its ability to escape from the skin, causing the skin to swell and deform. Inert particles such as char by providing extra channels for gas escape, not blocked by plastic materials, reduce the swelling and deformation, and are therefore beneficial.

Conversely if heating is slow gas can escape as fast as it is formed so that swelling will not occur or will be much less. The incorporation of rigidity-conferring inerts will, however, be much more difficult and these particles will act instead as discontinuities, reducing strength if present in too high proportions.

It is thought that finer grinding of the coal, although lowering the absolute porosity of the skin, provides an increase in the number of pores. At the same time it increases the surface area of the coal exposed during subsequent drying and other operations and therefore may cause the coal to become more oxidized than when less finely ground. For either of these reasons the foaming and hence swelling tendency of the skin would be reduced: in the former case because of provision of more channels for gas escape, in the latter because a reduction in fluido-plastic constituents would cause blocking of fewer channels. It cannot be said with certainty at present which mechanism, if either, is responsible.

The most suitable coking coals for use as the coke precursor are high fluidity, low to medium volatile coking coals. The particles of such coals, when ground, have the ability to coalesce into strong coke matrices, capable of incorporating appreciable proportions of inert particulate material, without an excessive tendency to swelling.

It is also important that these coals are used within a comparatively short time of their extraction from the mine e.g. about 1 month in the case of a South Bulli coal. This is because aerial oxidation causes progressive reduction of fluidity so that the ability of the fine coal particles to coalesce with themselves and with particles of inert material to form a strong matrix during coking diminishes. Swelling, however, which is dependent on the evolution of volatiles during coking is not comparably affected.

In commercial operation of the process of our invention wherein the coke is formed in situ in the reductive roasting kiln the rate of heating during the coking stage is largely determined by factors outside the immediate control of the operator.

If the rapid rate of heating (between 50–200° C per min) occurs during the coking stage we prefer to use a skin composed of coke derived from a mixture of coking coal and between 55 and 75 m/m of inerts.

If the rate of heating is slow (between 5–25° C per min) then we prefer to use a skin composed of coke derived from a mixture of coking coal and between 15 and 45 m/m of inerts.

The invention is now illustrated by, but by no means limited to, the following examples.

EXAMPLE 1

An iron ore consisting mainly of magnetite, $Fe_3O_4$, and with particle size 97.5% m/m less than 200 mesh BSS was formed into spherical agglomerates on a conventional pan pelletizer. These were screen sized to be between 9 and 11 mm diameter. Samples of the sized pellets were then returned to the pelletizer and by successive wettings and powder additions, a layer of various coke precursors mixed with 0.2% Dinagum was built up to a thickness of 2mm. The coke precursor consisted of a good quality coking coal having the following particle size distribution mixed 50:50 m/m with finely divided coke.

| Sieve No BSS | Mass % |
| --- | --- |
| +72 | 5.2 |
| −72 + 100 | 12.3 |
| −100 + 150 | 16.3 |
| −150 | 66.2 |

The coke precursor was mixed with sodium chloride sufficient to give the % of sodium chloride in the skin shown in Table I below. The amount of sodium chloride added to the mix is greater than that shown so as to compensate for migration of salt into that core during pelletisation.

After drying, these coated pellets were coked at 750° C in an atmosphere of nitrogen. The coked pellets were then heated in a stream of nitrogen and carbon monoxide (20% v/v). The temperature was maintained at 1080° C for twenty minutes.

After cooling, the product was examined and the results are shown in Table I.

TABLE I

| Run No | NaCl in skin (mass%) prior to coking | Appearance |
|---|---|---|
| 1 | 0 | Coalesced very severely. Very foamy and very friable. Solid mass with pellet identity lost. |
| 2 | 2 | Coalesced, severely deformed, extensively ruptured, very foamy, and very friable. |
| 3 | 5 | Formation of clusters, with some deformation, extensively ruptured, very foamy, readily abraded. |
| 4 | 10 | Discrete, extensively ruptured, somewhat foamy, mildly susceptible to abrasion. |
| 5 | 15 | Discrete, hard, dense, non-abradable. |

EXAMPLE 2

This example illustrates the continuous reductive processing of the uncoked pellets of Run No. 5 of Example 1.

Pellets of this composition were fed to a vertical kiln heated electrically to 1080° C. At regular intervals, pellets were withdrawn from the bottom of the kiln by a sliding grate mechanism. Fresh pellets at room temperature were added to the top of the kiln to maintain a constant level. A reducing atmosphere of carbon monoxide and hydrogen (10% v/v each) in nitrogen was maintained in the kiln.

The temperature of the discharged pellets was found to be 250° C. Thus, during their passage through the kiln, pellets were heated from room temperature through the coking region of 250° to 750° C to reaction temperature of 1080° C, held there while passing through a zone of constant temperature and cooled back close to room temperature. At the same time, they were supporting a column of incoming pellets of progressively increasing weight.

The product was substantially discrete and uncrushed pellets. Microscopic examination of the product showed that pellets consisted of a core of iron analysing 98% Fe, surrounded by a rigid skin of coke.

EXAMPLE 3

Example 1 run 5 was repeated except that the finely divided coke was replaced with finely divided brown coal char. The product was discrete, hard, dense and non-abradable pellets.

EXAMPLE 4

Example 1 run 5 was repeated, except that the iron ore core pellets were screen sized to be between 4 and 5 mm diameter. The product was discrete, hard, dense and non-abradable pellets.

EXAMPLE 5

Example 1 run 5 was replaced, except that the iron ore core pellets were screen sized to be between 14 and 16 mm. diameter. The product was discrete, hard, dense and non-abradable pellets.

EXAMPLE 6

Example 1 run No 5 repeated exactly except that the thickness of the coke precursor was as shown in the table below. The properties of the resultant reduced pellets are also shown in the table.

| Run No | Thickness of coating mm | Appearance |
|---|---|---|
| 1 | 0.5 | No coke skin mechanically weak |
| 2 | 1.0 | Very thin coke skin mechanically weak |
| 3 | 1.5 | Moderately strong pellets |
| 4 | 2.0 | Discrete, hard, dense, non-abradable, suitable for use in vertical kiln |
| 5 | 3.0 | Discrete, hard, dense, non-abradable, suitable for use in vertical kiln |

EXAMPLE 7

Example 1 run No 5 was repeated exactly except that the magnetite was replaced with the ores shown in the Table below. In each case the product was hard, dense and non-abradable and was mechanically strong enough for use in a vertical kiln.

| Run No | Ore |
|---|---|
| 1 | Amorphous haemetite containing 10% geothite (From Hammersley) |
| 2 | Ilmenite (West Australian beach sand) |
| 3 | Bauxite (From Weipa, Queensland) |
| 4 | Chromite (49% $Cr_2O_3$ and 20% FeO |
| 5 | Laterite (from New Caledonia) |
| 6 | Iron sand (New Zealand iron sand) |

EXAMPLE 8

Example 1 was repeated using different salts. The results are shown in the table below.

| Salt (Mass %) in the coke precursor skin | NaCl | KCl | $NH_4Cl$ | $CaCl_2$ | $MgCl_2$ | $AlCl_3$ | NaF | $CaF_2$ | $NaSO_4$ | $Na_2B_4O_7 \cdot 10H_2O$ |
|---|---|---|---|---|---|---|---|---|---|---|
| 0 | 1 | 1 | 1 | 1 | 1 | 1 | 1 | 1 | 1 | 1 |
| 2 | 1 | 1 | 1 | 1 | 1 | 2 | 1 | 1 | 1 | 2 |
| 5 | 2 | 2 | 2 | 2 | 2 | 6 | 2 | 2 | 2 | 7 |
| 10 | 3 | 3 | 3 | 3 | 3 | 7 | 6 | 3 | 2 | 7 |
| 15 | 4 | 4 | 4 | 5 | 5 | 7 | 6 | 5 | 6 | 7 |
| 20 | 4 | 4 | 5 | 6 | 6 | 7 | 7 | 6 | 6 | 7 |
| 25 | 5 | 5 | 6 | 6 | 6 | 7 | 7 | 6 | 7 | 7 |

1 = Severely agglomerated, ruptured, deformed
2 = Moderately agglomerated, ruptured, deformed
3 = Discrete but weakened by rupturing of skins
4 = Discrete, hard, dense, non-abradable
5 = Discrete, dense but with lowered resistance to crushing and abrasion
6 = Discrete but poor strength
7 = No strength, destroyed in coking process

We claim:

1. In a process for the direct reduction of ores containing iron oxides by the reductive roasting of pellets containing the ore, the improvement whereby the pellets retain their pellet form during reduction and have a reduced tendency to coalesce, said improvement comprising using for said reduction pellets which have been prepared by the following steps in sequence;
1. forming core pellets consisting essentially of finely ground ore or a mixture of finely ground ore and solid carbonaceous material;
2. coating the core pellets with a coke precursor so that the ratio of skin thickness of coke precursors to the diameter of the coke pellets is in the range from 1:20 to 1:2;
3. heating the coated pellets in a substantially non oxidizing atmosphere to a temperature below 1200° C but high enough to cause the coke precursor to form a coke skin around the coke pellet; the coke precursor comprising from 5 to 25% of a halide salt chosen from the group consisting of chlorides, alkaline earth metal chlorides and fluorides and ammonium chloride.

2. A process according to claim 1 wherein the halide salt is sodium chloride.

3. A process according to claim 1 wherein the coke precursor comprises from 10 to 20% of the halide salt.

4. A process according to claim 1 inclusive wherein the ratio of thickness of coke precursor to diameter of core in step 2 is from 0.8:10 to 2.3:10.

5. A process according to claim 1 inclusive wherein the ore containing iron oxide is chosen from the group consisting of magnetite, haematite, goethite, bauxite, ilmenite, limonite, titano-magnetite, laterite, chromite and serpentinite.

6. A process according to claim 1 inclusive wherein the core comprises solid carbonaceous material.

* * * * *